United States Patent Office 3,636,109
Patented Jan. 18, 1972

3,636,109
2,2'-ISOPROPYLIDENEBIS[(6 - LOWER ALKOXY-m-PHENYLENE)METHYLENE]BIS(2 - THIOPSEUDO-UREA) DIHYDROCHLORIDE
Henry E. Hennis, Coleman, and Duane B. Priddy, Lansing, Mich., assignors to The Dow Chemical Company, Midland, Mich.
No Drawing. Filed Feb. 5, 1969, Ser. No. 796,894
Int. Cl. C07c 123/00
U.S. Cl. 260—564 E
2 Claims

ABSTRACT OF THE DISCLOSURE

Compounds corresponding to the formula

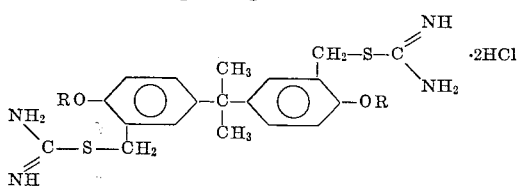

wherein R represents a lower alkyl group. The compounds are prepared by reactin a 2,2'-bis(α-chloro,4-lower alkoxy-m-tolyl)propane with thiourea. The compounds are useful as antimicrobials.

SUMMARY OF THE INVENTION

The present invention concerns new 2,2'-isopropylidene-bis[(6 - lower alkoxy - m-phenylene)methylene]bis(2-thiopseudourea) dihydrochloride corresponding to the formula

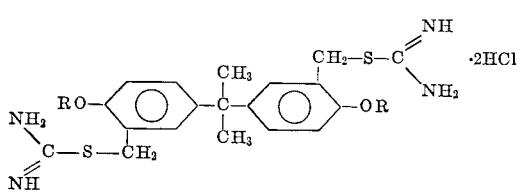

wherein R represents a lower alkyl group. In the specification and claims, the term "lower alkyl" refers to alkyl groups containing from 1, to 2, to 3, to 4 carbon atoms, for example, methyl, ethyl, n-propy, n-butyl, isopropyl, sec. butyl and isobutyl. The new compounds are solids at room temperature and have a low solubility in acetone, benzene and ethanol and a higher solubility in water. The compounds are antimicrobials and microbicides and are adapted to be used for the control of various bacterial and fungal organisms.

The compounds are prepared by reacting a 2,2-bis(α-chloro-4-alkoxy-m-tolyl)propane, hereinafter referred to as the chloromethyl diphenol ether reactant, with thiourea, according to the following equation:

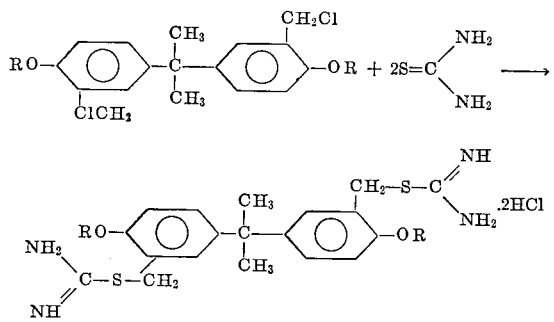

The reaction is conveniently carried out in the presence of a 1 to 4 carbon alcohol or a water-soluble ketone such as acetone or methyl ethyl ketone. The amounts of the reactants to be employed are not critical, some of the products being formed when employing any proportions. The reaction consumes the reactants in the ratio of one mole of the chloromethyl diphenyl ether reactant to two moles of thiourea and the employment of such proportions is advantageous. The reaction proceeds at a temperature at which chloride ion is liberated, conveniently at temperatures between 50° C. and reflux temperature.

In carrying out the reaction, the reactants are dissolved in the lower alkanol or ketone in any convenient fashion and maintained for a predetermined period of time in the reaction temperature range to complete the reaction. In a convenient procedure, the chloromethyl diphenol ether and the thiourea are added to the alkanol solvent medium with stirring. The liberated hydrogen chloride reacts with the amino group to give the corresponding 2,2'-isopropyli-denebis[(6 - lower alkoxy-m-phenylene)methylene]bis(2-thiopseudourea) compound as the dihydrochloride.

Upon completion of the reaction, the thiopseudourea compound is separated by conventional procedures. In a convenient operation, the reaction mixture is cooled to room temperature and slowly poured into an aromatic hydrocarbon such as benzene, toluene or xylene, and the white solid which separates is filtered and recrystallized from water to yield the compound of the present invention as a crystalline white solid.

DESCRIPTION OF THE PREFERRED EMBODIMENTS

The following examples completely describe representative specific embodiments and the best modes contemplated by the inventors for carrying out their invention.

Example 1.—2,2'-isopropylidenebis[(6-methoxy-m-phenylene)methylene]bis(2-thiopseudourea)dihydrochloride 2,2' - bis(α - chloro,4 - methoxy - m - tolyl)propane (10.6 g., .03 mole) and thiourea (4.5 g., 0.06 mole) are dissolved in 100 ml. of isopropanol and heated to reflux for 2 hours. The solution is cooled to room temperature and slowly poured into 500 ml. of toluene. The resulting white solid is separated by filtration and recrystallized from water to yield a crystalline white solid, M.P. >300° C., molecular weight 505.46. Infrared and chloride analyses are consistent with the assigned structure.

Example 2

Other representative compounds of the present invention, as set forth in following Table I, are prepared in accordance with the procedures described above using corresponding chloromethyl diphenol ethers as starting materials. In Table I the symbol "M.W." is used as an abbreviation of the term "molecular weight."

| R: | Characterizing property, M.W. |
|---|---|
| Ethyl | 533.5 |
| n-Propyl | 561.6 |
| Isopropyl | 561.6 |
| n-Butyl | 589.6 |
| Isobutyl | 589.6 |
| Sec butyl | 589.6 |

The new compounds are useful as antimicrobials and microbicides, particularly for the control of *Staphylococcus aureus*, *Bacillus subtilis*, acid fast bacterium, *Venturia inaequalis* (apple scab fungus) and *Phytophthora infestans* (tomato late blight). For such use, the unmodified compounds can be employed. Alternatively, the toxicant compounds can be dispersed on an inert finely-divided solid to prepare dust compositions. The dust compositions can be dispersed in water with or without the aid of a wetting or dispersing agent, the resulting aqueous dispersions being useful as sprays. In other procedures, the compounds can be employed as constituents in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating composition is not critical and may be varied considerably provided an effective amount of the toxicant is supplied, whether on the plant or plant part or in the soil or other environment of the organism. Good results are obtained when employing compositions containing microbicidal or antimicrobial concentrations and usually from about 1,000 to 10,000 parts per million by weight of one or more of the compounds. This is not to suggest that the compounds herein claimed and compositions containing them are equally effective at similar concentrations or against the same microbes. The concentration of toxicant in liquid compositions generally is from about 1–50 percent by weight. Concentrations up to 95 weight percent often are conveniently employed. In compositions to be employed as concentrates, the toxicant can be present in a concentration of from 5–98 weight percent.

In a representative operation, 2,2'-isopropylidenebis[(6-methoxy - m - phenylene)methylene]bis(2 - thiopseudourea) dihydrochloride is employed in an aqueous acetone composition at a concentration of 1000 parts per million by weight to prevent the growth (100% control) of apple scab fungus and tomato late blight. A concentration of 1000 parts per million by weight of the same compound in agar culture medium prevented the growth (100% control) of *Bacillus subtilis*, acid fast bacterium and *Staphylococcus aureus* under conditions wherein control plates showed no control of the growth of the test organisms. The related compounds of Table I have similar antimicrobial properties.

The 2,2' - bis[4 - alkoxy - 3 - (chloromethyl)phenyl] propane starting materials are prepared by chloromethylating a 2,2-bis(4 - alkoxyphenyl)propane, i.e., a diether of para,para'-isopropylidene diphenol according to the following equation:

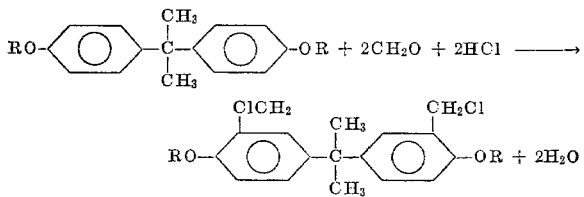

The reaction is conveniently carried out in the presence of acetic acid as a solvent reaction medium. The acetic acid also functions as a catalyst. Hydrogen chloride reactant is used, preferably as anhydrous gas, advantageously by saturating the acetic acid reaction medium therewith. The formaldehyde reactant also is advantageously dissolved in the reaction medium, conveniently as a low polymer such as trioxane or para-formaldehyde. The amounts of the reactants to be employed are not critical, some of the product being formed when employing any proportions. The reaction consumes the reactants in the ratio of one mole of the diphenol diether to two moles of each of the formaldehyde and hydrogen chloride chloromethylating reactants, and the employment of such proportions is advantageous. However, superior yields are obtained when using from 200 to 500 percent or more of theoretical proportions of formaldehyde and hydrogen chloride. The upper limits of the amounts of excess formaldehyde and hydrogen chloride used are ordinarily determined by the economics of the process. The reaction proceeds at a temperature at which water of reaction is liberated, conveniently at temperatures between 0° C. and reflux temperature. Pressure equipment can be used when it is desired to use temperatures higher than the normal atmospheric reflux temperature.

In carrying out the reaction, the diphenol diether and the chloromethylating reagents are contacted in any convenient fashion and maintained for a predetermined period of time in the reaction temperature range to complete the reaction. In a convenient procedure, the diphenol diether is added to a well-stirred solution of formaldehyde polymer and anhydrous hydrogen chloride in acetic acid, the solvent medium conveniently first having been saturated with anhydrous hydrogen chloride. During the addition of the diphenol diether to the chloromethylating reaction medium and for a period thereafter, the temperature of the reaction mixture is maintained within the reaction temperature range.

Upon completion of the reaction, the desired product is separated by conventional procedures. In a convenient operation, the reaction mixture is poured into water and the oily crude product which separates is washed with aqueous base, for example, aqueous 10 percent sodium hydroxide, potassium hydroxide, sodium carbonate or potassium carbonate. The so-washed oily product may usually be crystallized from a suitable solvent, e.g., aqueous ethanol, isopropanol or n-butanol and dried to give purified starting material.

What is claimed is:
1. The compound corresponding to the formula

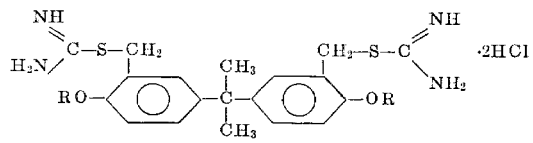

wherein R individually represents a lower alkyl group containing from 1 to 4 carbon atoms.

2. The compound as claimed in claim 1 wherein R represents a methyl group.

References Cited

UNITED STATES PATENTS 2,759,973    8/1956    Grogen et al. _____ 260—564
2,906,773    9/1959    Trapp _____ 260—465

OTHER REFERENCES

Chemical Abstracts, vol. 54, calumn 413 (1960).

LEON ZITVER, Primary Examiner

G. A. SCHWARTZ, Assistant Examiner

U.S. Cl. X.R.

424—326